(12) United States Patent
Ong et al.

(10) Patent No.: US 12,131,231 B2
(45) Date of Patent: Oct. 29, 2024

(54) FEDERATED LEARNING TECHNIQUE FOR APPLIED MACHINE LEARNING

(71) Applicant: International Business Machines Corporation, Armonk, NY (US)

(72) Inventors: Yuya Jeremy Ong, San Jose, CA (US); Yi Zhou, San Jose, CA (US); Nathalie Baracaldo Angel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 17/023,195

(22) Filed: Sep. 16, 2020

(65) Prior Publication Data

US 2022/0083906 A1    Mar. 17, 2022

(51) Int. Cl.
| | |
|---|---|
| G06N 20/00 | (2019.01) |
| G06F 17/18 | (2006.01) |
| G06F 18/21 | (2023.01) |
| G06F 18/214 | (2023.01) |
| G06F 18/25 | (2023.01) |
| G06N 5/01 | (2023.01) |

(52) U.S. Cl.
CPC ............ *G06N 20/00* (2019.01); *G06F 17/18* (2013.01); *G06F 18/214* (2023.01); *G06F 18/254* (2023.01); *G06N 5/01* (2023.01)

(58) Field of Classification Search
CPC .................................. G06N 20/00; G06N 5/01
See application file for complete search history.

(56) References Cited

U.S. PATENT DOCUMENTS

| | | | |
|---|---|---|---|
| 2013/0346182 A1* | 12/2013 | Cheng ............... | G06Q 30/0242 |
| | | | 705/14.41 |
| 2019/0340534 A1 | 11/2019 | McMahan | |
| | | (Continued) | |

FOREIGN PATENT DOCUMENTS

| | | |
|---|---|---|
| CN | 110263936 | 9/2019 |
| CN | 110443063 | 11/2019 |

OTHER PUBLICATIONS

Hesham Mostafa, "Robust Federated Learning Through Representation Matching and Adaptive Hyperparameters", 2019 (Year: 2019).*

(Continued)

*Primary Examiner* — Van C Mang
(74) *Attorney, Agent, or Firm* — Peter J. Edwards

(57) ABSTRACT

A method, a computer program product, and a system of training a machine learning model using federated learning with extreme gradient boosting. The method includes computing an epsilon hyperparameter using training dataset sizes from a first party and a second party. The method also includes transmitting a machine learning model and the epsilon hyperparameter to the first party and the second party and receiving a first model update and a second model update from the first party and the second party respectively. The method further includes fusing the first model update and the second model update to produce a global histogram and determining at least one split candidate in a decision tree used by the machine learning model using the global histogram. The method also includes rebuilding the machine learning model by adding the split candidate to a decision tree of the machine learning model.

19 Claims, 6 Drawing Sheets

(56) References Cited

U.S. PATENT DOCUMENTS

2020/0042828 A1 2/2020 Silberman
2020/0050951 A1 2/2020 Wang
2020/0167691 A1* 5/2020 Golovin .................. G06N 3/08

OTHER PUBLICATIONS

Goulin Ke, "LightGBM: A Highly Efficient Gradient Boosting Decision Tree", 2017 (Year: 2017).*
Qing Sun, "Active Learning for Structured Probabilistic Models with Histogram Approximation", 2015 (Year: 2015).*
Liu Yang : et al: Title: Boosting Privately: Federated Extreme Gradient Boosting For Mobile Crowdsensing.
Yang Liu et al.; Boosting Privately: Privacy-Preserving Federated Extreme Boosting for Mobile Crowdsensing; Publication Ttl: arXiv, 10pp.; 2019; Publisher: arXiv; Country of Publication: USA; Database: INSPEC(R).
Chen et al, "XGBoost: A Scalable Tree Boosting System," 2016 ACM. ISBN 978-1-4503-4232-2/16/08, 10 pages.
Chen et al, "XGBoost: A Scalable Tree Boosting System Supplementary Material," 2016 ACM. ISBN 123-4567-24-567/08/06, 4 pages.
Cheng et al, "SecureBoost: A Lossless Federated Learning Framework" Jan. 25, 2019.
Greenwald et al, "Space-Efficient Online Computation of Quantile Summaries," pp. 1-9.
Leung et al, "Towards Privacy-Preserving Collaborative Gradient Boosted Decision Trees," 10 pages.
Masson et al, "DDSketch: A Fast and Fully-Mergeable Quantile Sketch with Relative-Error Guarantees," Proceedings of the VLDB Endowment, vol. 12, No. 12, ISSN 21508097, pp. 2195-2205.
Truex, et al, "A Hybrid Approach to Privacy-Preserving Federated Learning, " London '19, Nov. 15, 2019, London, UK.
Xu et al, "HybridAlpha: An Efficient Approach for Privacy-Preserving Federated Learning," ACM ISBN 978-1-4503-6833-09/19/11.
Yang et al, "The Tradeoff Between Privacy and Accuracy in Anomaly Detection Using Federated XGBoost," Oct. 14, 2019.

* cited by examiner

FEDERATED LEARNING TECHNIQUE FOR APPLIED MACHINE LEARNING

STATEMENT REGARDING PRIOR DISCLOSURES BY THE INVENTOR OR A JOINT INVENTOR (IF APPLICABLE)

The following disclosure(s) are submitted under 35 U.S.C. 102(b)(1)(A):
DISCLOSURE(S): Title: Federated Decision Tree and Gradient Boost. Integrating Multiple Federated Models, Authors: Heiko Ludwig, Nathalie Baracaldo, Yi Zhou, Yuya Ong, Marius Danciu, Publisher: International Business Machines, IBM Data Science and AI Webcast, Date: Jun. 4, 2020.

BACKGROUND

The present disclosure relates to federated learning, and more specifically, using federated learning techniques to train machine learning models.

Federated learning is a machine learning technique that trains algorithms across multiple decentralized edge devices or servers holding local data samples, without exchanging the samples. The general principle of federated learning consists of training localized models on local data samples and exchanging parameters between local nodes to generate a global model shared by all nodes.

Gradient boosting is a machine learning technique that produces a prediction model in the form of an ensemble of weak prediction models, typically in the form of decision trees. Extreme gradient boosting ("XGBoost") is a scalable implementation of the gradient boosting framework that combines a linear model with a boosting tree model. It can use a first derivative and a second derivative of a loss function for second-order derivation. This allows the algorithm to converge faster than a typical gradient boosting algorithm while also improving efficiency of the optimal solution of the model.

SUMMARY

Embodiments of the present disclosure include a computer-implemented method of training a machine learning model using federated learning with extreme gradient boosting. The computer-implemented method includes computing an epsilon hyperparameter using training dataset sizes from a first party and a second party. The epsilon hyperparameter adjusts bin sizes and is specific to each party based on the training dataset sizes. The computer-implemented method also includes transmitting a machine learning model and the epsilon hyperparameter to the first party and the second party. The computer-implemented method further includes receiving a first model update and a second model update from the first party and the second party, respectively. Each of the model updates includes a histogram, a gradient, and hessian statistics based on applying the machine learning model and the epsilon hyperparameter to training data stored by the first party and the second party. The computer-implemented method also includes fusing the first model update and the second model update to produce a global histogram. The global histogram represents training data from the first party and the second party. The computer-implemented method further includes determining at least one split candidate in a decision tree used by the machine learning model using the global histogram and rebuilding the machine learning model by adding the split candidate to the decision tree.

Additional embodiments of the present disclosure include a computer program product of training a machine learning model using federated learning with extreme gradient boosting, which can include computer-readable storage medium having program instructions embodied therewith, the program instruction executable by a processor to cause the processor to perform a method. The method includes computing an epsilon hyperparameter using training dataset sizes from a first party and a second party. The epsilon hyperparameter adjusts bin sizes and is specific to each party based on the training dataset sizes. The method also includes transmitting a machine learning model and the epsilon hyperparameter to the first party and the second party. The method further includes receiving a first model update and a second model update from the first party and the second party, respectively. Each of the model updates includes a histogram, a gradient, and hessian statistics based on applying the machine learning model and the epsilon hyperparameter to training data stored by the first party and the second party. The method also includes fusing the first model update and the second model update to produce a global histogram. The global histogram represents training data from the first party and the second party. The method further includes determining at least one split candidate in a decision tree used by the machine learning model using the global histogram and rebuilding the machine learning model by adding the split candidate to the decision tree.

Further embodiments are directed to a system f of training a machine learning model using federated learning with extreme gradient boosting and configured to perform the methods described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
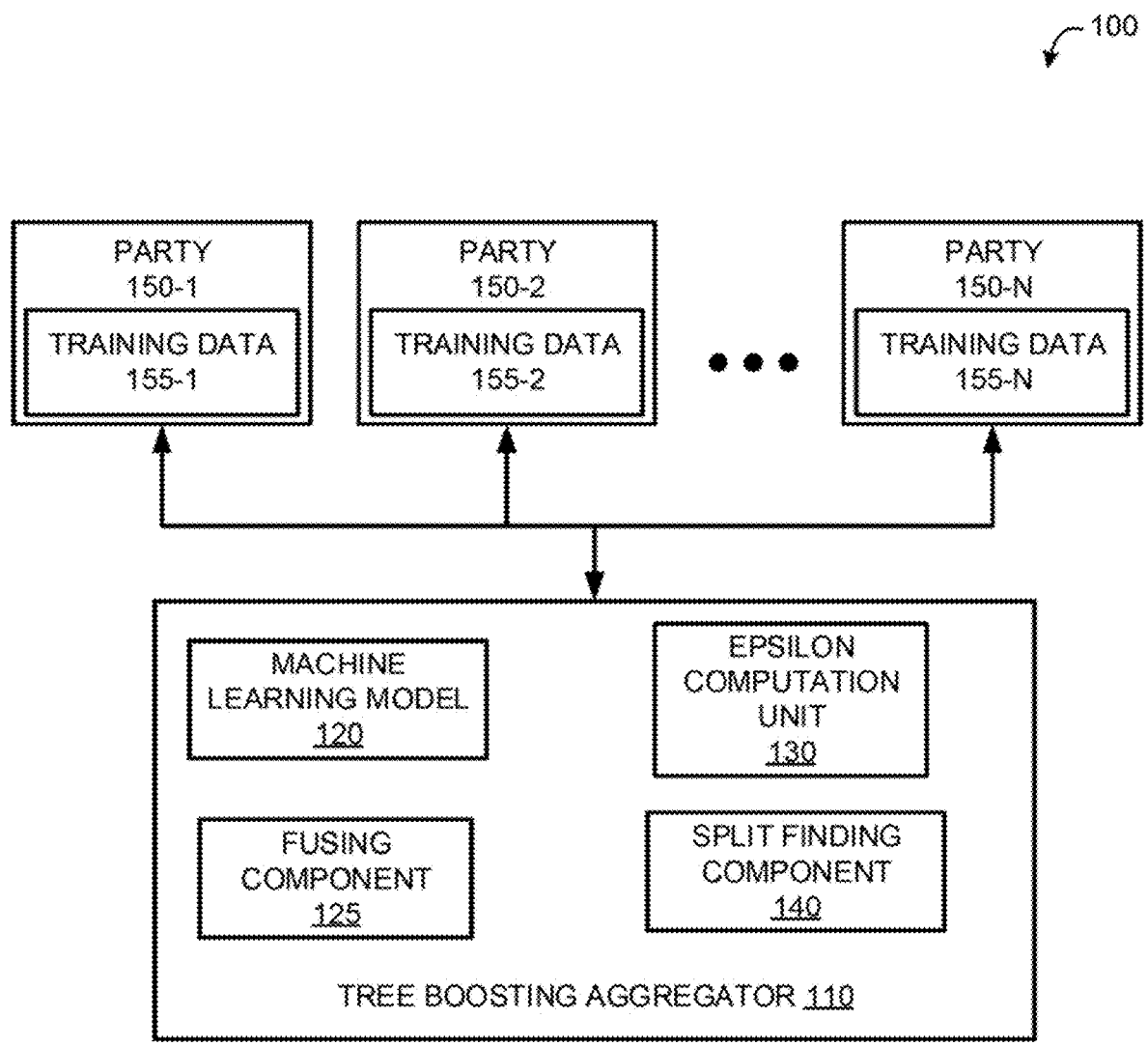
FIG. 1 is a block diagram illustrating a federated learning environment, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to federated learning, and more specifically, using federated learning techniques to train machine learning models. While the present disclosure is not necessarily limited to such applications, various aspects of the disclosure may be appreciated through a discussion of various examples using this context.

Generally, a large amount of data is required to empower artificial intelligence (AI) applications effectively. However, in many application domains, it can be challenging to obtain the amount of data necessary for these applications. Frequently, individuals or corporations only have a small amount of data where either the data is too small, or it lacks essential information, such as missing values or labels.

Traditionally, data generated and owned by different parties and organizations would be collected and transferred to a centralized location to allow machine learning models to be built and trained using the collected data. However, data ownership concerns may arise during an attempt to acquire data. For example, a product recommendation service owner may claim ownership of the data regarding the products and purchase transactions but may lack ownership over the data regarding user purchasing behavior.

Additionally, recently enacted laws make collecting and sharing data among different organizations increasingly difficult, if not outright prohibited. Also, the sensitive nature of specific data (e.g., financial information, medical records) restricts the free circulation of that data. Thus, the sensitive data is typically isolated and maintained by the data owners.

Federated learning resolves the problem of data fragmentation and isolation, while also complying with privacy-related laws. Federated learning aims to build a joint machine learning model based on data located across multiple sites. Two or more parties are interested in jointly building a machine learning model that holds data that can contribute to the model. During the training process, the data is held by each party and does not leave the party. The model can then be transferred in part from one party to another under an encryption scheme, such that other parties cannot re-engineer the data at any given party. The resulting model is approximate to an ideal model with all data transferred to a single party.

Gradient tree boosting, also known as gradient boosting machine or gradient boosted regression tree, is a widely used machine learning method that is typically used with decision trees of a fixed size as base learners. Typical gradient boosting algorithms begin by training a decision tree in which each observation is assigned an equal weight. After evaluating the first tree, observations that are difficult to classify are given more weight, while observations that are easy to classify are given less weight. A second tree is generated based on this weighted data.

XGBoost improves upon standard gradient tree boosting techniques using a tree learning algorithm. It is an end-to-end system that includes a sparsity-aware algorithm, a weighted quantile sketch procedure enabling the handling of instance weights in approximate tree learning, and a cache-aware block structure for out-of-core tree learning.

Limitations on federated learning a machine learning model using XGBoost exist, however, as current implementations require the training data to determine split candidates. In decision tree learning, a tree is built by splitting the source set, constituting the root node of the tree, into subsets constituting the successor children. The splitting can be based on a set of splitting rules based on classification features. The process is repeated on each derived subset in a recursive manner. In order to find a split candidate efficiently, the XGBoost algorithm sorts the training data according to feature values and visits the data in sorted order to accumulate gradient statistics for the structure. However, federated learning prevents a single entity from observing the entire training dataset, thereby preventing the entity from sorting the data and selecting an optimal split candidate.

Embodiments of the present disclosure may overcome the above and other problems by using a tree boosting aggregator for training a machine learning model using federated learning with extreme gradient boosting. The tree boosting aggregator accomplishes the training by transmitting an epsilon hyperparameter and a machine learning model to each party participating in the federated learning process. Each party can transmit back corresponding model updates to the tree boosting aggregator, including local histograms of the training data used. Using the model updates from each party, the tree boosting aggregator can fuse the local histograms into a global histogram that anonymously reflects the entire training data used. The tree boosting aggregator can then determine split candidates from the global histogram to rebuild the decision tree of the machine learning model using the split candidates.

More specifically, the tree boosting aggregator collects gradients, hessian statistics, and split thresholds from each party. XGBoost can be utilized to conduct an additive training method in an iterative manner. The XGBoost performs a federated quantile sketch method to fuse the histograms received from each party resulting in a global histogram. The global histogram is a surrogate representation of all of the training data without the raw values of the training data. The tree boosting aggregator can determine the optimal split candidates using the global histogram and grow the decision tree of the machine learning model.

In some embodiments, the tree boosting aggregator conducts the training process in an iterative manner. Starting with the rebuilt machine learning model that the added splits to the decision tree as well as the epsilon hyperparameter, the tree boosting aggregator transmits the model and the epsilon hyperparameter to each of the parties and receives back new model updates and new histograms from the parties. The tree boosting aggregator can determine new split candidates from a new global histogram from the information received back from the parties to rebuild the machine learning model by adding additional splits. The machine learning model and epsilon hyperparameter can act as an initial model transmitted to the parties for another iteration until a predetermined stopping criterion is achieved.

In some embodiments, the stopping criterion is a predetermined depth of the decision tree. For example, once the tree reaches a depth value of twelve then the stopping criterion has been achieved. The number of edges can determine tree depth from a node to the decision tree's root node.

In some embodiments, the tree boosting aggregator accounts for the task the machine learning model is performing. XGBoost algorithm is compatible with several supervised learning tasks such as, for example, classification, regression, and ranking-based problems. The tree boosting aggregator can determine the type of task assigned to the machine learning model and decide on the bin size to be used by the global histogram. For example, if the machine learning model is performing a classification task, a large bin size is selected. Otherwise, a small bin size is selected.

Referring now to FIG. 1, shown is a high-level block diagram of a federated learning environment 100 for training a machine learning model using XGBoost. The federated learning environment 100 includes a tree boosting aggregator 110, party 150-1, 150-2, 150-N (collectively "parties 150") where N is a variable integer representing any number of possible parties 150. The tree boosting aggregator 110 includes a machine learning model 120, a fusing component 125, an epsilon computation unit 130, and a split finding component 140. The parties 150 include training dataset 155-1, 155-2, 155-N (collectively "training datasets 155"), respectively.

The tree boosting aggregator 110 is a component of the federated learning environment 100 configured to train the machine learning model 120 using the XGBoost algorithm. The tree boosting aggregator 110 can initialize a connection with the parties 150 to initiate a training cycle for the machine learning model 120. Additionally, the tree boosting aggregator 110 can query each party 150 requesting the number of samples in each of their training datasets 155 that can then be provided to the epsilon computation unit 130.

The tree boosting aggregator 110 can build the machine learning model 120 using the XGBoost algorithm to recursively build upon a base learner decision tree. After each training iteration of the machine learning model 120, a split candidate can be added to the decision tree where the previous tree had the largest errors or residuals. The boosted decision tree can be grown recursively, using information from the previous decision tree iteration to improve performance.

The tree boosting aggregator 110 is further configured to transmit the machine learning model 120 and an epsilon hyperparameter to the parties 150. The parties can then train their respective machine learning model 120 using their respective training datasets 155. The tree boosting aggregator is further configured to receive model updates, including computed gradients, hessian statistics, and histograms from each of the parties 150. For example, party 150-1 can train the machine learning model 120 transmitted to it by the tree boosting aggregator 110 using the training dataset 155-1. Upon completion of the training cycle, the party 150-1 can compute the gradient, hessian statistics, and histogram relating to the trained machine learning model 120 and training dataset 155-1.

The machine learning model 120 is a component of the tree boosting aggregator 110 configured as a predictive model using decision tree learning. The machine learning model 120 can use a decision tree as a predictive model to go from observations about an item, represented as branches, to conclusions about the item, represented as leaves. Tree models where the target variable can take a discrete set of values are called classification trees. In classification trees, the leaves represent class labels and branches represent conjunctions of features that lead to those class labels. Decision trees where the target variable can take continuous values (e.g., real numbers) are called regression trees.

During training, the machine learning model 120 can be trained using the XGBoost framework to incrementally build upon the decision tree. At each training cycle, XGBoost can emphasize the training instances previously mis-modeled. The leaves that contained errors can then be split to grow the decision tree to allow for higher accuracy in the machine learning model's 120 predictions.

The fusing component 125 is a component of the tree boosting aggregator 110 configured to fuse histograms generated and provided by the parties 150 into a global histogram. In some embodiments, the fusing component 125 generates a surrogate dataset of the training datasets 155. The fusing component 125 can utilize the histogram, an ordered list of feature values, and a bin index from each of the parties 150 to extrapolate the surrogate dataset of the training datasets 155. The ordered list of feature values can define the threshold for each bin per histogram ranges, and the bin index is an index of values corresponding to which particular bin samples fall under. The list of feature values and the bin index can be provided in the model updates transmitted to the tree boosting aggregator 110 by the parties 150.

In some embodiments, the fusing component 125 computes an optimal bin resolution, based on a learning task performed by the machine learning model 120. For example, if the learning task is based on classification, then the fusing component 125 finds the largest bin resolution. If the learning task is based on regression, then the fusing component 125 finds the smallest bin resolution. The fusing component 125 can then construct the global histogram using the surrogate dataset and the new bin size based on the learning task. This can be accomplished by finding new thresholds and computing a new index value per sample.

In some embodiments, the fusing component 125 fuses the histograms into the global histogram by merging bins nearest to each other and replacing them with a single bin. The merging can continue until the global histogram meets a predefined maximum bin size.

The epsilon computation component 130 is a component of the tree boosting aggregator 110 configured to compute individualized epsilon hyperparameters for each of the parties 150. The epsilon hyperparameter can be used as a bin size indicator for each party 150, which can dictate the accuracy of the histogram approximation. In some embodiments, the epsilon computation component 130 computes the epsilon hyperparameter as a sample ratio-based distribution. The epsilon computer component 130 can compute the epsilon as a sample ratio-based distribution using equation 1 defined below:

$$\epsilon_i = \epsilon \left( \frac{|d_i|}{\sum_{d \in D} |d|} \right) \qquad \text{Equation 1}$$

where $\in$ represent the epsilon hyperparameter defined as a global measure of how much to approximate the surrogate dataset of the training dataset 155 from each of the parties 150. The training dataset 155 from each of the parties 150 can be defined as $D=\{d_1, d_2, \ldots, d_n\}$. The $\in_i$ can represent the epsilon hyperparameter score for each i-th worker. The $\in$ value can be split with the ratio of the i-th party's training dataset 155 size to the total number of data amongst the parties 150. Thus, each party 150 can contribute a surrogate representation of the dataset with the optimal number of the histogram bins as define by $$\frac{1}{\epsilon},$$

which can be defined by equation 2, defined below:

$$\frac{1}{\epsilon_i} = \frac{1}{\epsilon\left(\frac{|d_i|}{\sum_{d \in D}|d|}\right)} = \frac{\sum_{d \in D}|d|}{\epsilon|d_i|} \quad \text{Equation 2}$$

The split finding component 140 is a component of the tree boosting aggregator 110 configured to determine split candidates for decision trees used by the machine learning model 120. Typical split finding algorithms require the raw training datasets to enumerate all possible splits by sorting the data according to feature values and to visit the data in sorted order to accumulate gradient statistics. However, in federated learning, the training datasets 155 remain with the parties 150. As such, the split finding component 140 is configured to utilize an approximation algorithm to determine split candidates. The split finding component 140 can determine the split candidates based on points according to percentiles of feature distribution represented in the histograms provided by the parties 150 after training. The split finding component 140 can map the continuous features into buckets split by the split candidates, aggregate the statistics, and find the best split candidate based on aggregated statistics.

The parties 150 are the participants in the federated learning environment 100 performing localized training of the machine learning model 120 using their respective training dataset 155. Using the machine learning model 120, the parties 150 can compute predictions using their respective training dataset 155. Additionally, the parties 150 can compute the gradient and hessian statistics of the computed predictions.

The parties 150 optimize the objective function, which is used during the training of the machine learning model 120 using their respective training dataset 155. The objective function is defined by equation 3, as follows:

$$Obj^{(t)} = \sum_{i=1}^{n} l(y_i, \hat{y}_i^{(t-1)} + f_t(x_i)) + \Omega(f_t) + \text{constant} \quad \text{Equation 3}$$

where, n is the total number of sample training dataset 155, i is the index of the ith dataset in the sample training dataset 155, and t is the index of the current training rounds for the machine learning model 120. l is the loss function of the corresponding machine learning model 120 which takes the parameters $y_i$, the actual value from the i-th sample training data set 155, and $\hat{y}_i^{(t-1)}$ is the prediction from the t−1-th model of the machine learning model 120 on the i-th sample from the sample training dataset 150, and $f_t(x_i)$ is the value of the t-th round's machine learning model 120 evaluated on the i-th input data sample training dataset 155, $x_i$. $\Omega(f_t)$ is a regularization component added to the objective function which prevents the t-th round's machine learning model 120 from overfitting on the sample training dataset 150. A constant can also be appended to the objective function in equation 3.

In some embodiments, to approximate the loss function defined by equation 3, which can define an approximation of the objective function by taking the second order Taylor expansion of the objective, which we can rewrite the objective function by equation 4, as follows:

$$Obj^{(t)} \cong \sum_{i=1}^{n} \left[ l(y_i, \hat{y}_i^{(t-1)}) + g_i f_t(x_i) + \frac{1}{2} h_i f_t^2(x_i) \right] + \Omega(f_t) + \text{constant} \quad \text{Equation 4}$$

$g_i$, which is defined as, $$g_i = \partial_{\hat{y}_i^{(t-1)}} l(y_i, \hat{y}_i^{(t-1)}),$$

is the gradient with respect to the prediction from the t−1-th model of the machine learning model 120 on the i-th sample from the sample training dataset 150 evaluated on the loss function parameterized by the i-th sample from the sample training dataset 150 and the prediction from the t−1-th model of the machine learning model 120 on the i-th sample from the sample training dataset 150. $h_i$, which is defined as, $h_i =$ $$\partial^2_{\hat{y}_i^{(t-1)}} l(y_i, \hat{y}_i^{(t-1)}),$$

is the second order gradient or the hessian with respect to the prediction from the t−1-th model of the machine learning model 120 on the i-th sample from the sample training dataset 150 evaluated on the loss function parameterized by the i-th sample from the sample training dataset 150 and the prediction from the t−1-th model of the machine learning model 120 on the i-th sample from the sample training dataset 150.

The parties 150 can also exploit the epsilon hyperparameter using a quantile sketch process to generate histograms reflecting their respective training datasets 155. The epsilon hyperparameter can be used as a bin size when generating the histogram. Histograms can be used to summarize label and feature values of the training dataset 155. A histogram can be built over the training dataset 155 in a single pass. For each sample in the training dataset 155, a new bin is added to the histogram. Binning is a method of turning continuous variables (e.g., labels and features) into categorical values. The values can be grouped into a predefined number of bins determined by the epsilon hyperparameter. The continuous values can then get replaced by a string describing the bin that contains the value, thereby anonymizing the information contained in the continuous variables.

It is noted that FIG. 1 is intended to depict the major representative components of an exemplary federated learning environment 100. In some embodiments, however, individual components may have greater or less complexity than as represented in FIG. 1, components other than or in addition to those shown in FIG. 1 may be present, and the number, type, and configuration of such components may vary.

Figure 2:
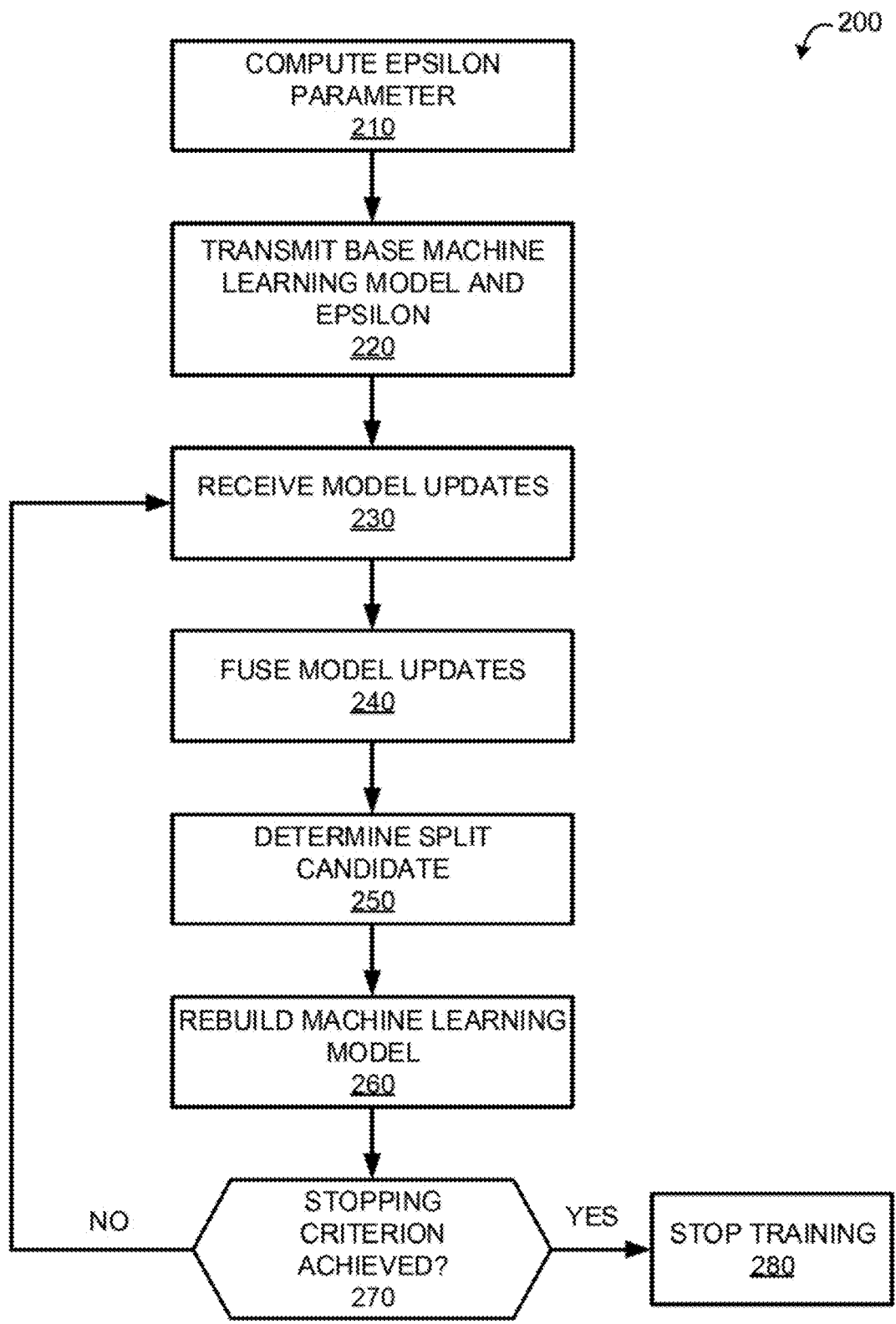
FIG. 2 is a flow diagram illustrating a federated learning process, in accordance with embodiments of the present disclosure.

FIG. 2 is a flow diagram illustrating a process 200 of federated learning a machine learning model using the XGBoost framework, in accordance with embodiments of the present disclosure. The process 200 can be implemented by, for example, one or more entities in a federated learning environment 100, a computer system 500, a processor, or another configuration of hardware and/or software.

The process 200 begins by the epsilon computation component 130 computing an epsilon hyperparameter using training dataset sizes from a first party 150 and a second party 150. This is illustrated at step 210. The epsilon hyperparameter can adjust the bin sizes used to generate the histograms of the training datasets 155 and is specific to each party 150 based on the training dataset 155 sizes from each party 150.

The tree boosting aggregator 110 can query each party 150 for the number of samples in their respective training dataset 155. Based on the number of samples in each training dataset 155, the tree boosting aggregator 110 can compute a ratio of those samples per party. The epsilon computation component 130 can utilize a baseline global epsilon hyperparameter with the sample ratio per party to compute and transmit an individualized epsilon hyperparameter to each party 150 participating in the learning process.

The tree boosting aggregator 110 transmits the machine learning model 120 and the epsilon hyperparameter to the parties 150. This is illustrated at step 220. Once transmitted, each party can compute predictions using their respective machine learning model 120 using their training dataset 155 and epsilon hyperparameter. The parties 150 can then compute model updates, such as gradients, index thresholds, bin indexes, and hessian statistics from those predictions as well as histograms representing their training datasets 155. Once computed, each party 150 can transmit the model updates and histograms back to the tree boosting aggregator 110 for further computation.

The tree boosting aggregator 110 receives the model updates from each of the parties 150. This is illustrated at step 230. Using the model updates, the fusing component 125 fuses the histograms of the parties 150 into a global histogram. This is illustrated at step 240. The global histogram can reflect an anonymized representation of the entire training dataset 155 used by all of the parties 150. The fusing component 125 can construct a surrogate index and compute a bin size for each of the histograms received. Once determined, the fusing component 125 can generate the global histogram from the computed bin sizes and histograms.

In some embodiments, the epsilon computation component 130 recomputes the epsilon hyperparameters for each of the parties 150 based on the global histogram and samples per party. For example, the global histogram may reflect that the first party 150 requires a larger bin size while the second party 150 requires a smaller bin size. The epsilon hyperparameters can be adjusted accordingly.

The split finding component 140 utilizes an approximation algorithm to determine split candidates for the machine learning model 120. This is illustrated at step 250. The split finding component 140 can determine the split candidates based on points according to percentiles of feature distribution represented in the histograms provided by the parties 150 after training. The split finding component 140 can map the continuous features into buckets split by the split candidates, aggregate the statistics, and find the best split candidate based on aggregated statistics.

The tree boosting aggregator 110 can rebuild the machine learning model 120 using the split candidates determined by the split finding component 140. This is illustrated at step 260. The decision tree of the machine learning model 120 can be viewed as an initial fixed function. The decision tree is rebuilt by adding the split candidates to leaves with the highest gain. A gain is computed at each leaf with the added split candidate. The leaf, or feature, with the highest gain, is selected as the leaf in which the split candidate is placed upon, thereby growing the decision tree and rebuilding the machine learning model 120.

The rebuilt machine learning model 120 can be analyzed to determine whether a stop criterion has been achieved. This is illustrated at step 270. The rebuilt machine learning model and the epsilon hyperparameters can be transmitted to the parties 150, where the parties 150 can train and test the machine learning model 120. If the machine learning model 120 has not reached a stopping criterion, the process 200 can return to step 230 and repeat the steps in a recursive manner until the stopping criterion is achieved. However, if the stopping criterion is achieved, the process 200 is complete, and the training process stops. This is illustrated at step 280. In some embodiments, the stopping criterion is a number of iterations the process 200 performs. In some embodiments, the stopping criterion is a measurement of accuracy the machine learning model 120 must achieve in its predictions prior to stopping. In some embodiments, the stopping criterion is a depth of the decision tree used by the machine learning model 120.

Figure 3:
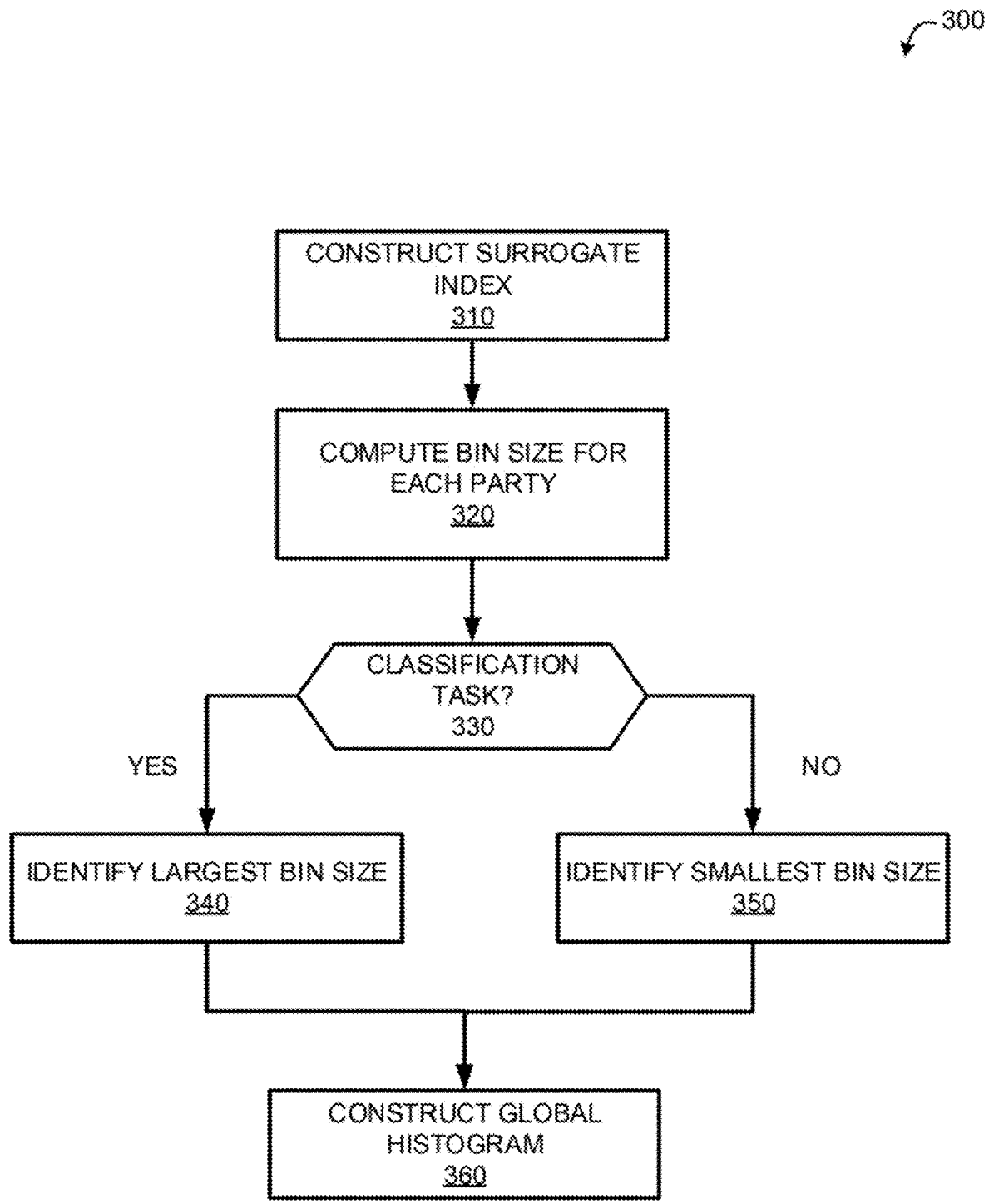
FIG. 3 is a flow diagram illustrating a histogram fusing process, in accordance with embodiments of the present disclosure.

FIG. 3 is a flow diagram illustrating a process 300 of fusing histograms to generate a global histogram, in accordance with embodiments of the present disclosure. The process 300 can be implemented by, for example, one or more entities in a federated learning environment 100, a computer system 400, a processor, or another configuration of hardware and/or software. In some embodiments, the process 300 is a sub-process of step 240 of FIG. 2.

The fusing component 125 constructs a surrogate index from the lists of feature values and the bin indexes transmitted in the model updates from each of the parties 150. This is illustrated at step 310. The surrogate index can be an aggregation of the values and bins of the histograms. The fusing component analyzes the bin size of each histogram to identify the various bin sizes used by the parties 150 when constructing their respective histograms. This is illustrated at step 320.

Once the bins sizes are computed, the fusing component 125 can make a determination as to what bin size to use for the global histogram. The fusing component 125 can analyze the machine learning model 120 and determine whether the machine learning model 120 is performing a classification task or not. This is illustrated at step 330. If the machine learning model 120 is performing a classification task, then the largest bin size identified from the model update information is selected. This is illustrated at step 340. However, if the bin size is not a classification task, such as a regression task, then the smallest bin size identified and selected. This is illustrated at step 350.

The fusing component 125 constructs a global histogram using the surrogate index and the identified bin size. This is illustrated at step 360. The global histogram can be a surrogate representation of all of the training data without the raw values of the training data. The split finding component 140 can then determine split candidates from the global histogram and the tree boosting aggregator 110 can use the split candidates to rebuild the decision tree of the machine learning model 120.

Figure 4:
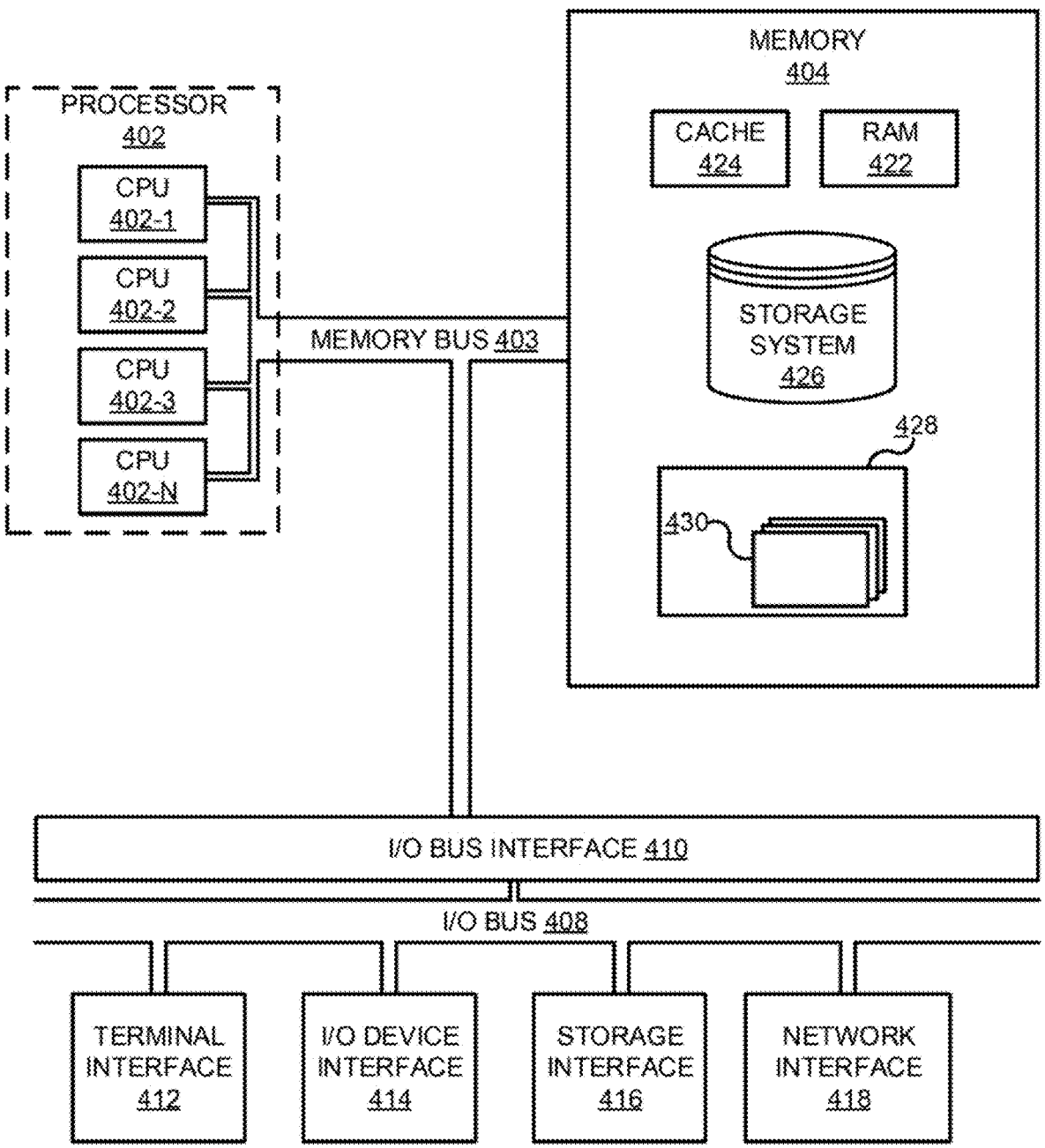
FIG. 4 is a high-level block diagram illustrating an example computer system that may be used in implementing one or more of the methods, tools, and modules, and any related functions, described herein, in accordance with embodiments of the present disclosure.

Referring now to FIG. 4, shown is a high-level block diagram of an example computer system 400 (e.g., the federated learning environment 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 401 may execute instructions stored in the memory 404 and may include one or more levels of on-board cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the federated learning environment 100), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
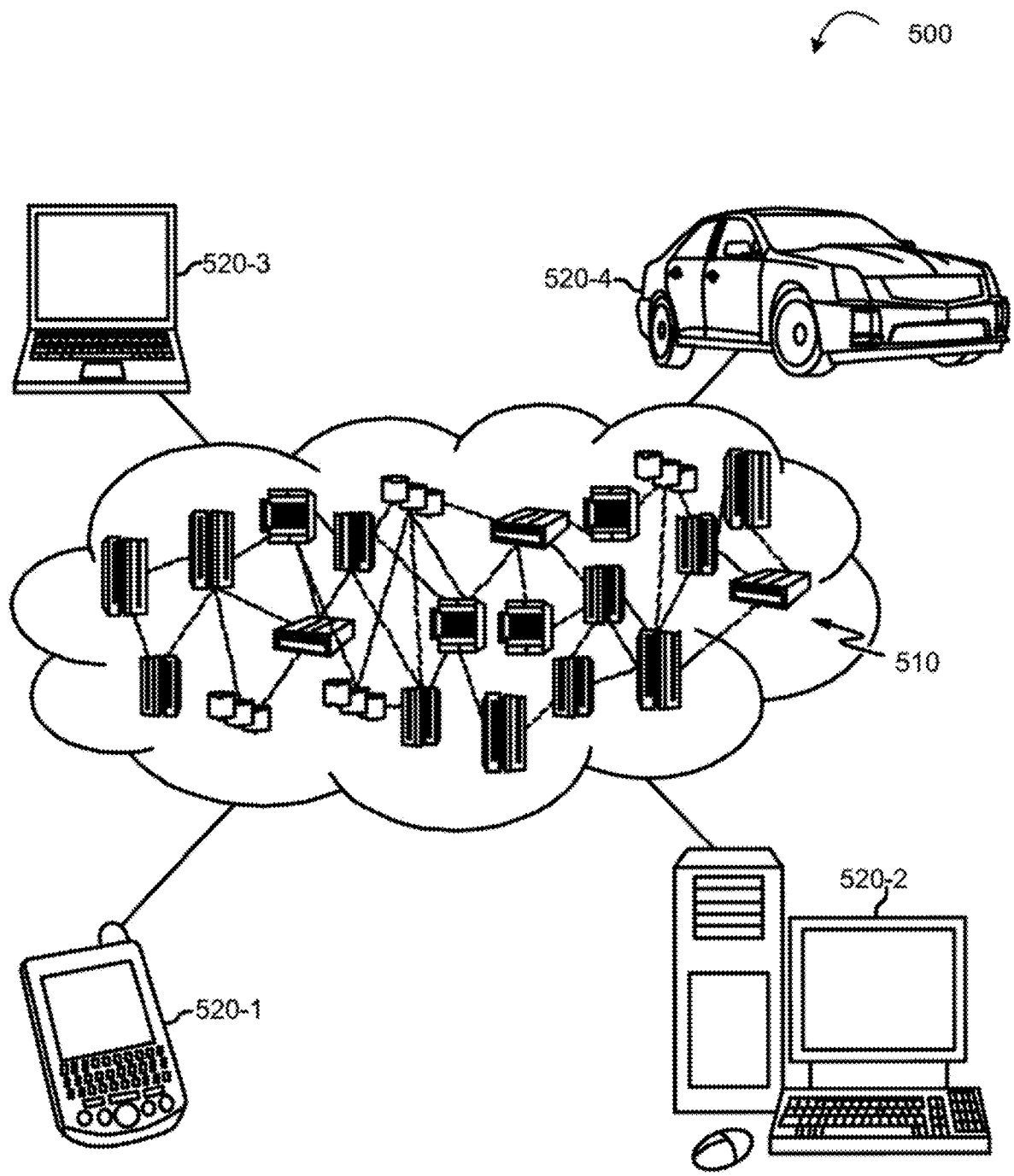
FIG. 5 depicts a cloud computing environment, in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (P.D.A.) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
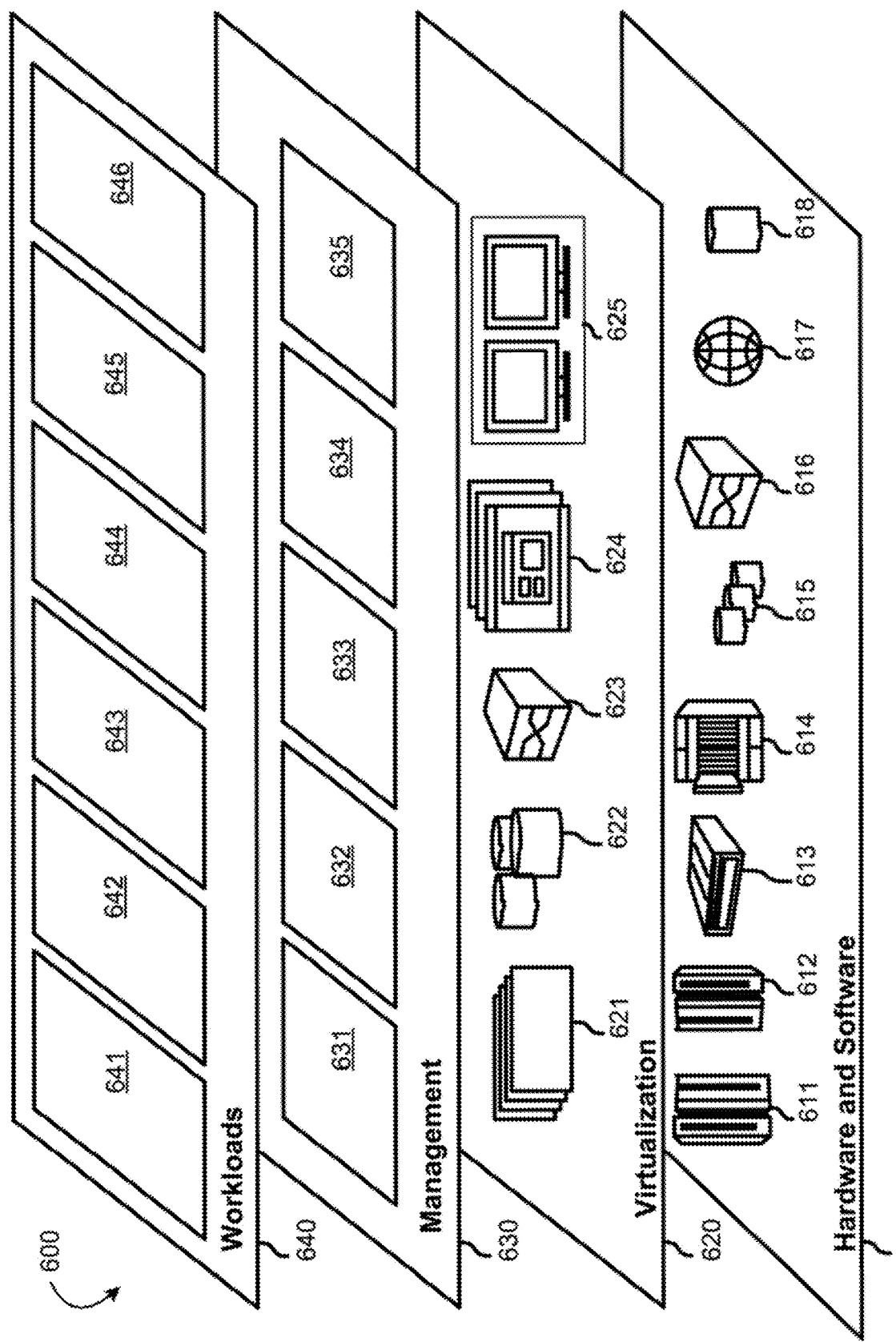
FIG. 6 depicts abstraction model layers, in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (S.L.A.) planning and fulfillment 635 provide pre-arrangement for, and procurement of, cloud computing resources for which a future requirement is anticipated in accordance with an S.L.A.

Workloads layer 640 provides examples of functionality for which the cloud computing environment may be utilized. Examples of workloads and functions which may be provided from this layer include mapping and navigation 641; software development and lifecycle management 1342 (e.g., the federated learning environment 100); virtual classroom education delivery 643; data analytics processing 644; transaction processing 645; and training a machine learning model using federated learning 646.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (R.O.M.), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (I.S.A.) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (P.L.A.) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of training a machine learning model using federated learning, the computer-implemented method comprising:

computing an epsilon hyperparameter using training dataset sizes from a first party and a second party, wherein the epsilon hyperparameter adjusts bin sizes and is specific to each party based on the training dataset sizes;

transmitting a machine learning model and the epsilon hyperparameter to the first party and the second party;

receiving a first model update and a second model update from the first party and the second party respectively, wherein each of the model updates includes a histogram, a gradient, and hessian statistics based on applying the machine learning model and the epsilon hyperparameter to training data stored by the first party and the second party;

fusing the first model update and the second model update to produce a global histogram, wherein the global histogram represents training data from the first party and the second party;

determining at least one split candidate in a decision tree used by the machine learning model using the global histogram, wherein the decision tree takes the form of an initial fixed function; and rebuilding the machine learning model by adding the split candidate to the decision tree, wherein rebuilding the machine learning model comprises recursively building upon the decision tree after adding the split candidate.

2. The computer-implemented method of claim 1, further comprising:

starting with the rebuilt machine learning model and the epsilon hyperparameter, rebuilding the machine learning model using subsequent splits in an iterative manner, with the machine learning model with updated split values acting as an initial model transmitted to the first party and the second party for a next iteration, until a predetermined stopping criterion is achieved.

3. The computer-implemented method of claim 2, wherein the predetermined stopping criterion is a predetermined depth of the decision tree.

4. The computer-implemented method of claim 1, wherein the epsilon hyperparameter represents a sample ratio-based epsilon distribution based on a training data size of the first party and the second party.

5. The computer-implemented method of claim 1, further comprising:

computing an updated epsilon hyperparameter for each party based on the global histogram.

6. The computer-implemented method of claim 1, wherein determining at least one split candidate is based on the global histogram.

7. The computer-implemented method of claim 1, wherein fusing the first model update and the second model update comprises:

constructing a surrogate index from lists of feature values and bin indexes located in the first model update and the second model update;

identifying bin sizes used by the first party and the second party;

selecting an identified bin size based on a learning task assigned to the machine learning model; and constructing the global histogram using the surrogate index and the identified bin size.

8. The computer-implemented method of claim 7, wherein the learning task is a classification task that selects the largest identified bin size.

9. The computer-implemented method of claim 7, wherein the learning task is a regression task that selects the smallest identified bin size.

10. A computer program product for training a machine learning model using federated learning, the computer program product comprising:
one or more computer readable storage media, and program instructions stored on the one or more computer readable storage media, the program instructions comprising:
program instructions to compute an epsilon hyperparameter using training dataset sizes from a first party and a second party, wherein the epsilon hyperparameter adjusts bin sizes and is specific to each party based on the training dataset sizes;
program instructions to transmit a machine learning model and the epsilon hyperparameter to the first party and the second party;
program instructions to receive a first model update and a second model update from the first party and the second party respectively, wherein each of the model updates include a histogram, a gradient, and hessian statistics based on applying the machine learning model and the epsilon hyperparameter to training data stored by the first party and the second party;
program instructions to fuse the first model update and the second model update to produce a global histogram, wherein the global histogram represents training data from the first party and the second party;
program instructions to determine at least one split candidate in a decision tree used by the machine learning model using the global histogram, wherein the decision tree takes the form of an initial fixed function; and
program instructions to rebuild the machine learning model by adding the split candidate to the decision tree, wherein rebuilding the machine learning model comprises recursively building upon the decision tree after adding the split candidate.

11. The computer program product of claim 10, further comprising:
program instructions to start with the rebuilt machine learning model and the epsilon hyperparameter, rebuilding the machine learning model using subsequent splits in an iterative manner, with the machine learning model with updated split values acting as an initial model transmitted to the first party and the second party for a next iteration, until a predetermined stopping criterion is achieved.

12. The computer program product of claim 11, wherein the predetermined stopping criterion is a depth of the decision tree.

13. The computer program product of claim 10, wherein the epsilon hyperparameter represents a sample ratio-based distribution based on a training data size of the first party and the second party.

14. The computer program product of claim 10, further comprising:
program instructions to compute an updated epsilon hyperparameter for each party based on the global histogram.

15. The computer program product of claim 10, wherein fusing the first model update and the second model update comprises:
program instructions to construct a surrogate index from lists of feature values and bin indexes located in the first model update and the second model update;
program instructions to identify bin sizes used by the first party and the second party;
program instructions to select an identified bin size based on a learning task assigned to the machine learning model; and
program instructions to construct the global histogram using the surrogate index and the identified bin size.

16. The computer program product of claim 15, wherein the learning task is a classification task and the identified bin size is a largest identified bin size.

17. A system for training a machine learning model using federated learning, the system comprising:
a machine learning model configured as a predictive model using decision tree learning;
a memory in communication with the processor, the memory containing program instructions that, when executed by the processor, are configured to cause the processor to perform a method, the method comprising:
transmitting the machine learning model and individualized epsilon hyperparameters to a first party and a second party participating in the federated learning;
computing the individualized epsilon hyperparameters for the first party and the second party, wherein the epsilon hyperparameter represents a bin size indicator;
fusing histograms generated and provided by the first party and the second party into a global histogram;
computing split candidates based on the global histogram;
rebuilding the machine learning model by adding the split candidates to a decision tree used by the machine learning model, wherein the decision tree takes the form of a function, and recursively building upon the decision tree after adding the split candidate.

18. The system of claim 17, wherein the rebuilding further comprises the machine learning model using subsequent split candidates in an iterative manner, with the machine learning model with updated split values acting as an initial model transmitted to the first party and the second party for a next iteration, until a predetermined stopping criterion is achieved.

19. The system of claim 18, wherein the method further comprises updating the individualized epsilon hyperparameters for the first party and the second party after each iteration.

* * * * *